United States Patent

[11] 3,625,458

[72] Inventors Peter Karl-Heinz Fischer; Rudolph Herrmann Mesecke; Hans-Joachim Schoening, all of Monterey Park, Calif.

[21] Appl. No. 844,573
[22] Filed July 24, 1969
[45] Patented Dec. 7, 1971

[73] Assignees S. James Wild; Michael B. Montgomery Los Angeles; Peter Karl-Heinz Fischer, Monterey Park; Hans-Joachim Schoening, Monterey Park; Harold B. Guyer, Los Angeles, Calif.

[54] DRIVE MECHANISM FOR SOUND RECORDING AND PLAYBACK DEVICES
5 Claims, 2 Drawing Figs.

[52] U.S. Cl. .......... 242/201, 242/206, 242/209
[51] Int. Cl. .......... G11b 15/28, G11b 15/30
[50] Field of Search .......... 242/201, 202, 203, 204, 206, 207, 208, 209, 210, 191, 196, 192, 199, 200, 179, 67.4

[56] References Cited

UNITED STATES PATENTS 3,471,104 10/1969 Wakabayashi .......... 242/201

FOREIGN PATENTS 933,179 8/1963 Great Britain .......... 242/201
1,037,636 8/1966 Great Britain .......... 242/201

OTHER REFERENCES

Hornstein, German Printed Application 1,241,142, Published 5-1967 242/209

*Primary Examiner*—George F. Mautz
*Attorney*—Harris, Kiech, Russell & Kern

ABSTRACT: A compact drive mechanism for a tape recorder enabling the recorder to rapidly drive tape in a forward or a reverse direction or at a slower record and playback speed. The drive mechanism includes a motor having a double-ended drive shaft. A pair of friction clutch means is connected to forward and reverse tape-driving spindles of the recorder for selective coupling to opposite ends of the drive shaft to effect the rapid forward and reverse tape drive. A transmission means connects between one end of the drive shaft and the capstan of the recorder to turn the capstan at the record and playback speed. This occurs when the friction clutch couples the forward tape-driving spindle to the drive shaft. Thus, when the pinch roller of the recorder is engaged, the capstan drive overrides the clutch means of the forward tape-driving spindle causing it to slip and tape to be driven from a reel on the reverse tape-driving spindle to a reel on the forward tape-driving spindle at the playback and recording speed.

INVENTORS.
PETER KARL-HEINZ FISCHER,
RUDOLPH HERRMANN MESECKE,
HANS-JOACHIM SCHOENING,
By THEIR ATTORNEYS.
HARRIS, KIECH, RUSSELL & KERN.

DRIVE MECHANISM FOR SOUND RECORDING AND PLAYBACK DEVICES

The present invention relates to improvements in compact and portable tape recorders and, more particularly, to a novel drive mechanism for such recorders enabling the recorder to rapidly drive tape in a forward or reverse direction or at a slower record and playback speed.

In recent years, portable tape recorders including portable dictating machines have become more and more popular. Accompanying the increase in popularity has been a reduction in the size of such portable tape recorders. In fact, it is very common today for business and professional men to carry compact tape recorders in their brief cases to meetings and conferences where they can either record the conference or immediately thereafter dictate their comments concerning the meeting.

As tape recorders have become more compact, certain features of the tape recorders have been sacrificed. For example, the more compact tape recorders only have a relatively fast reverse drive in addition to their conventional forward record and playback drive. The fast forward drive feature has been eliminated since heretofore it has required relatively complex, large and expensive mechanisms. The deletion of the fast forward drive feature, of course, is very undesirable from the user's standpoint.

Accordingly, it is an object of the present invention to provide a simple, inexpensive and highly efficient motor drive mechanism for a compact tape recorder which enables the recorder to drive tape rapidly in a forward as well as in a reverse direction or at a slower record and playback speed.

Another object of the present invention is to provide a compact drive mechanism of the foregoing character incorporating a motor drive including a double-ended drive shaft in combination with selectively operable friction clutch means for selectively and rapidly driving forward and reverse tape-driving spindles of the tape player from opposite ends of the drive shaft.

A further object of the invention is to provide a compact drive mechanism as just described including transmission means between the capstan of the tape recorder and one end of the drive shaft for overriding the clutch means associated with the forward drive spindle to turn the capstan and drive tape in a forward direction at the record and playback speed when the pinch roller of the tape player is engaged.

Additional objects and advantages of the present invention may be more clearly understood by reference to the following detailed description when considered with the drawing which illustrates, by way of example only, a motor drive mechanism for a tape recorder embodying the features of the invention. In the drawing.

Figure 1:
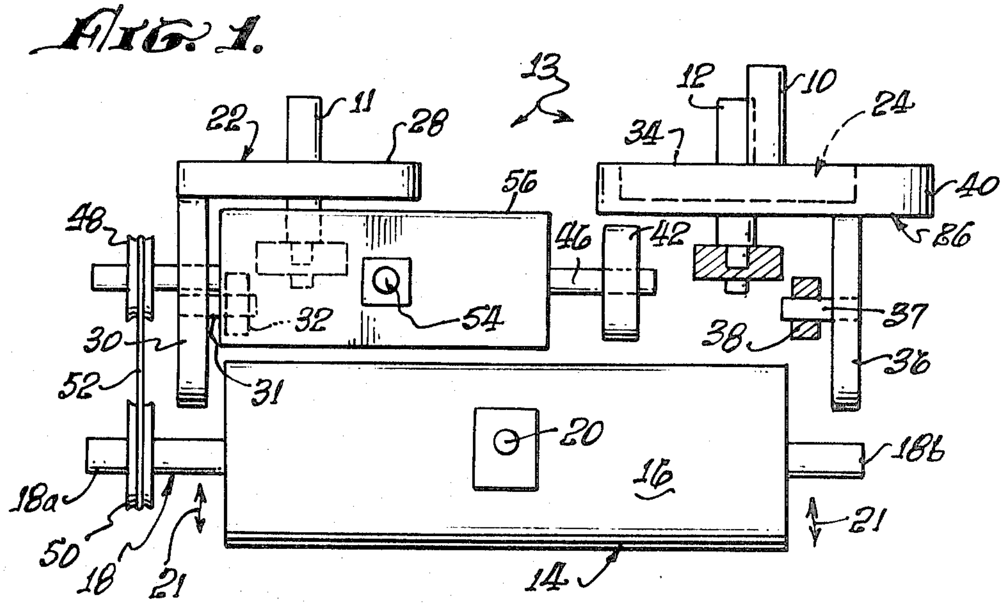
FIG. 1 is a schematic side view of the motor drive mechanism.
Figure 2:
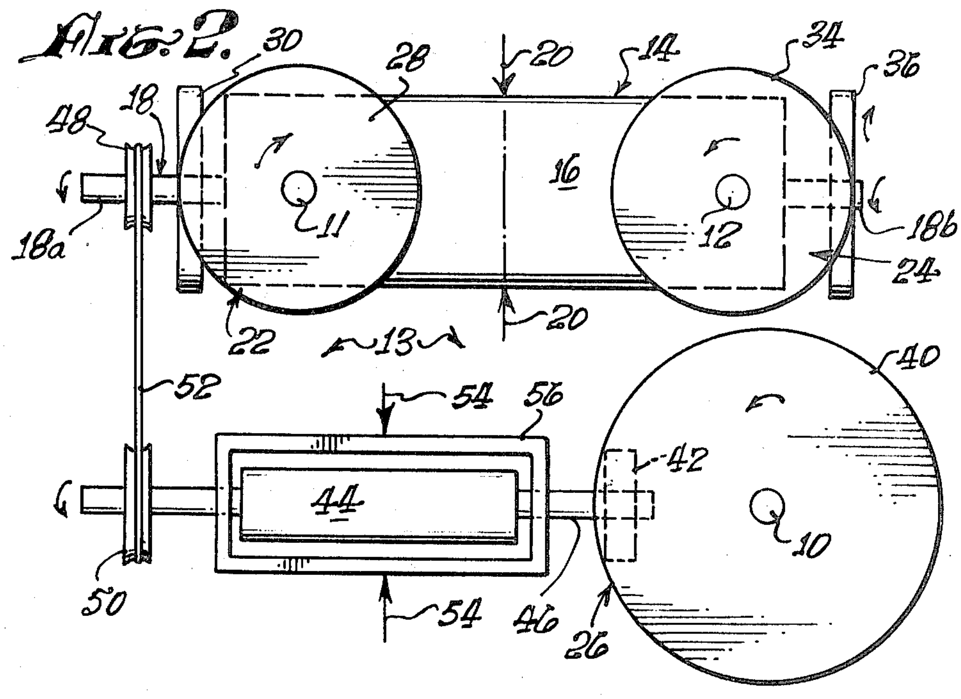
FIG. 2 is a schematic plan view of the motor drive mechanism shown in FIG. 1.

In the drawing, 10, 11, and 12 schematically represent the capstan, reverse tape-driving spindle, and forward tape-driving spindle of a compact tape recorder 13. The capstan and spindles extend above the top of the deck of the recorder and are vertically supported for turning about their longitudinal axes by bearings secured in the housing of the recorder. The capstan 10 is forward of the spindles 11 and 12 and the reverse tape-driving spindle 11 is disposed to the left of and spaced laterally from the forward tape-driving spindle 12. Other conventional components of the tape recorder 13 such as the pinch roller, pinch roller actuating means, and electrical circuit components are not illustrated in the drawing in order that the novel features of the drive mechanism may be clearly illustrated and understood.

The compact drive mechanism is represented generally by the numeral 14 and includes a motor 16 having a double-end shaft 18, opposite ends of the shaft being represented as 18*a* and 18 *b*. The motor 16 is mounted below the spindles 11 and 12 with the shaft 18 in a vertical plane including the spindles. The mount for the motor 16 comprises a pair of pivot pins 20 secured to the recorder housing and to opposite sides of the motor to support the motor for turning or tilting movement about a horizontal axis transverse to the shaft 18. Thus supported, and as depicted by the arrows 21, the motor may be tilted from a normal horizontal position to a first tilt position with the shaft end 18*a* slightly raised above the horizontal and to a second tilt position with the shaft end 18*b* slightly raised above the horizontal. The means for tilting the motor 16 are not shown but may include any conventional manual tilting arrangement or a conventional electromechanical arrangement such as a pair of spaced selectively actuable solenoids.

In addition to the motor 16, the drive mechanism 14 includes three torque transmission mechanisms 22, 24, and 26. The torque transmission mechanisms 22, 24, and 26 cooperate with the motor 16, spindles 11 and 12, and capstan 10 such that the spindles 11 and 12 may be selectively and rapidly driven at predetermined reverse and forward tape-driving speeds, respectively, and such that the capstan may be driven at a predetermined but slower forward record and playback speed. When the capstan 12 is turning at the forward record and playback speed and the pinch roller (not shown) is actuated to bear against the capstan, the capstan and its associated torque transmission mechanism 26 override the torque transmission mechanism 24 associated with the forward tape-driving spindle 12 to cause the torque transmission mechanism 24 to effectively slip and tape to be driven under tension from a reel on the reverse tape-driving spindle 11 to a reel on the forward tape-driving spindle 12 at the forward record and playback speed. Otherwise, and when the pinch roller is not actuated, tape may be selectively driven at the predetermined reverse and forward speeds with selective operation of the torque transmission mechanisms 22 and 24.

The torque transmission mechanism 22 (which may be considered as a friction clutch device) is selectively energized or actuated when the motor 16 is tilted to its first position and as illustrated in the drawing, includes a turntable 28 and a transmission wheel 30. The turntable 28 is secured to and carried by the reverse tape-driving spindle 11 for turning therewith. The transmission wheel 30 is mounted under and normal to the turntable 28 by an axle 31 and bearing support 32. Thus supported, an upper peripheral edge portion of the transmission wheel 30 engages an under surface of the turntable 28 and a lower peripheral edge portion is adapted to circumferentially and frictionally engage the shaft end 18*a* when the motor 16 is in its first tilted position. When the motor 16 is in the first tilted position, a counterclockwise turning of the shaft 18 effects a clockwise rotation of the transmission wheel 30 to produce a clockwise turning of the turntable 28 and hence of the reverse tape-driving spindle at the predetermined reverse tape-driving speed.

The second torque transmission mechanism 24 (which may be considered as a slipping friction clutch device) is selectively energized or actuated when the motor 16 is in the second tilt position and as illustrated in the drawing includes a turntable 24 and transmission wheel 26. The turntable 34 is secured to and carried by the forward tape-driving spindle 12 for turning therewith. The transmission wheel 36 is mounted under and normal to the turntable 34 by an axle 37 and bearing support 38. Thus supported, an upper peripheral edge portion of the transmission wheel engages an under surface of the turntable 34 and a lower peripheral edge portion is adapted to circumferentially and frictionally engage the shaft end 18*b* when the motor 16 is in its second tilted position. When the motor 16 is in the second tilted position, the torque transmission mechanism 22 is disengaged. A clockwise turning of the shaft end 18*b* then produces a counterclockwise rotation of the transmission wheel 36 to effect a counterclockwise turning of the turntable 34. This, in turn, causes the forward tape-driving spindle 12 to rotate at the predetermined forward tape-driving speed.

The third torque transmission mechanism 26 illustrated in the drawing includes a flywheel 40, friction wheel 42, a balancing roller 44 carrying a transmission shaft 46, a pair of pulleys 48 and 50 and a continuous belt 52. The balancing roller 44 is mounted in a horizontal plane forward and slightly above the motor 16. The mount for the roller comprises a pair of pivot pins 54 secured to the recorder housing and to opposite sides of a yoke 56 extending around and supporting opposite ends of the transmission shaft 46. The pivot pins 54 thus support the roller and transmission shaft for a limited tilting movement on a horizontal axis transverse to the shaft.

The right end of the transmission shaft 46 carries the friction wheel 42 such that an upper peripheral edge portion will engage the under surface of the flywheel 40 when the right end of the roller is tilted slightly upward. The flywheel is secured to the capstan 10 for turning therewith in a horizontal plane. The left end of the transmission shaft 46 carries the pulley 48 for turning therewith while the pulley 50 is mounted on the shaft end 18*a*. The continuous belt 52 loops around the pulleys to complete the transmission mechanism 26.

When the motor 16 is in its normal or first tilted position, the belt 52 is slack and the friction wheel 42 is separated slightly from the flywheel 40. When the motor 16 swings to its second tilted position, however, the pulley 50 moves downward to effect a tight driving engagement between the belt 52 and the pulleys. In addition, the downward movement of the pulley 48 causes the roller to tilt and bring the friction wheel 42 into tight driving engagement with an under surface of the flywheel 40. Hence, when the motor is in its second tilted position, a counterclockwise turning of the shaft end 18*a* effects a counterclockwise turning of the transmission shaft 46 through the pulley system to produce a counterclockwise turning of the flywheel 40 and hence of the capstan 10 at the predetermined forward record and playback speed.

As previously indicated, when the motor 16 is in the second tilted position, the torque transmission mechanism 24 is energized to rapidly turn the forward tape-driving spindle at the forward tape-driving speed. As just described, the capstan 18 is also driven at the slower forward record and playback speed when the motor 16 is in the second tilted position. This simultaneous operation is of no consequence, however, when the pinch roller is not actuated, since the capstan cannot then drive tape and simply turns as the forward tape-driving spindle rapidly draws tape from a reel on a reverse tape-driving spindle to a reel on a forward drive spindle substantially at the forward tape-driving speed. However, when the pinch roller is actuated and bears tightly against the capstan 10, the capstan, through the torque transmission mechanism 26 overrides the forward tape-driving spindle 12 in that the transmission wheel 36 slips on the shaft end 18*b* and tape is drawn from the reel on the spindle 11 to the reel on the spindle 12 at the record and playback speed. Under such conditions, the torque transmission device 24 functions as a simple slipping clutch to maintain tension in the tape and to effect a winding of the tape on the reel on the spindle 12.

Thus, with a simple highly compact and inexpensive mechanism, the present invention provides a tape recorder with a rapid forward tape drive as well as a rapid reverse tape drive. Also, the drive mechanism effectively drives tape at the normal record and playback speed. It should be noted that the drive mechanism is located solely between the spindles and the capstan and does not increase the size of the tape recorder while providing forward, reverse, and record and playback drive features for the tape recorder.

While a particular drive mechanism has been described in detail herein, changes and modifications may be made in the illustrated form without departing from the spirit of the invention. Therefore, it is intended that the present invention be limited in scope only by the terms of the following claims.

We claim:

1. A drive mechanism for a compact tape recorder including a capstan, a selectively operable pinch roller, and a forward tape-driving spindle laterally spaced from a reverse tape-driving spindle, said drive mechanism comprising:

a drive motor having first and second drive shaft means;

pivot means supporting said drive motor for tilting movement on an axis transverse to said drive shaft means between normal and first and second tilted positions;

first torque transmission means connected to said reverse drive spindle for coupling to said first drive shaft means when said motor is in said first tilted position to turn said reverse drive spindle at a predetermined reverse drive speed in response to operation of said drive motor;

second torque transmission means connected to said forward tape-driving spindle for frictional drive coupling to said second drive shaft means when said motor is in said second tilted position to turn said forward tape-driving spindle at a predetermined forward drive speed in response to operation of said drive motor, said second torque transmission means comprising a turntable on said forward tape-driving spindle, a transmission wheel engaging said turntable and journaled for turning on an axis transverse thereto with a circumferential edge adapted to frictionally engage said second drive shaft means when said drive motor is in said second tilted position; and third torque transmission means operative when said drive motor is in said second tilted position for turning said capstan at a forward record and playback speed less than said forward drive speed whereby when said pinch roller is operated and bearing against said capstan, tape is transported from a reel on said reverse driving spindle to a reel on said forward driving spindle at said forward record and playback speed and slippage occurs between said transmission wheel and said second drive shaft means.

2. The drive mechanism of claim 1 wherein said third torque transmission means comprises a flywheel on said capstan for turning therewith, a transmission shaft, a friction wheel on one end of said transmission shaft for circumferentially engaging said flywheel, a pulley on an opposite end of said transmission shaft, a second pulley on said first drive shaft means, and a continuous belt extending around said first and second pulleys whereby operation of said drive motor when in said second tilted position produces a turning of said capstan through said first and second pulleys, said transmission shaft, and said friction wheel.

3. The drive mechanism of claim 2 further including means pivotally supporting said transmission shaft for tilting movement on an axis transverse thereto.

4. The drive mechanism of claim 2 wherein said first torque transmission means comprises a turntable on said reverse tape-driving spindle, a transmission wheel engaging said turntable and journaled for turning on an axis transverse thereto with an edge adapted to circumferentially and frictionally engage said first drive shaft means when said drive motor is in said first tilted position.

5. In a portable tape recorder or the like including a vertical capstan and a selectively operable pinch roller for pressing against said capstan, the combination comprising:

vertically extending and laterally spaced forward and reverse drive spindles for turning about their vertical longitudinal axes;

a drive motor having a double-ended shaft for turning said shaft in a predetermined direction;

pivot means supporting said drive motor for tilting movement on a horizontal axis between normal and first and second tilted positions with opposite ends of said drive shaft immediately under said reverse and forward drive spindles respectively;

first torque transmission means mounted above a first end of said drive shaft and connected to said reverse drive spindle for coupling to said first end of said drive shaft when said motor is in said first tilted position to turn said reverse drive spindle at a predetermined reverse drive speed in response to operation of said drive motor;

second torque transmission means immediately above a second end of said drive shaft and connected to said forward drive spindle for frictional drive coupling to said second end of said drive shaft when said motor is in said second tilted position to turn said forward drive spindle at a predetermined forward drive speed in response to operation at said drive motor; and third torque transmissions means operative when said drive motor is in said second tilted position for turning said capstan at a forward record and playback speed less than said forward drive speed whereby when said pinch roller is operated and bearing against said capstan, tape or the like is transported from a reel on said reverse drive spindle to a reel on said forward drive spindle at said forward record and playback speed and slippage occurs between said second transmission means and said second end of said drive shaft.

* * * * *